(12) United States Patent
Noh et al.

(10) Patent No.: US 11,530,000 B2
(45) Date of Patent: Dec. 20, 2022

(54) SANDWICH PANEL FLOOR MODULAR STRUCTURE

(71) Applicants: Hyundai Motor Company, Seoul (KR); Kia Motors Corporation, Seoul (KR); KOLONGLOTECH. Inc, Seoul (KR)

(72) Inventors: Woon Seok Noh, Siheung-si (KR); Hyun Ahn, Seoul (KR); Sun Yoon, Anyang-si (KR); Hyun Jun Na, Seoul (KR); Jun Soo Kim, Suwon-si (KR); Jae Kuk Park, Yongin-si (KR)

(73) Assignees: Hyundai Motor Company, Seoul (KR); Kia Motors Corporation, Seoul (KR); KOLONGLOTECH. Inc, Seoul (KR)

( * ) Notice: Subject to any disclaimer, the term of this patent is extended or adjusted under 35 U.S.C. 154(b) by 329 days.

(21) Appl. No.: 16/985,364

(22) Filed: Aug. 5, 2020

(65) Prior Publication Data
US 2021/0179189 A1  Jun. 17, 2021

(30) Foreign Application Priority Data
Dec. 11, 2019  (KR) .......... 10-2019-0164233

(51) Int. Cl.
*B62D 25/20* (2006.01)
*B60N 2/015* (2006.01)
*B60R 16/02* (2006.01)
*B62D 29/04* (2006.01)

(52) U.S. Cl.
CPC ......... *B62D 25/20* (2013.01); *B60N 2/01508* (2013.01); *B60R 16/0215* (2013.01); *B62D 29/041* (2013.01)

(58) Field of Classification Search
CPC .... B62D 25/20; B62D 29/041; B62D 29/005; B60N 2/01508; B60N 2/01525; B60N 2/0715; B60R 16/0215; B32B 27/308; B32B 3/12; B32B 27/08; B32B 27/20; B32B 2262/101; B32B 2307/56; B32B 2307/718; B32B 2605/00
USPC ........................................... 296/204
See application file for complete search history.

(56) References Cited

U.S. PATENT DOCUMENTS

| | | | |
|---|---|---|---|
| 6,089,521 A | 7/2000 | Tarusawa et al. | |
| 6,135,529 A * | 10/2000 | De Angelis | B60R 7/04 224/281 |
| 9,308,945 B2 * | 4/2016 | Preisler | B60R 13/013 |
| 9,399,435 B2 * | 7/2016 | Preisler | B32B 21/14 |
| 2005/0242604 A1 * | 11/2005 | Bonnes | B60R 7/04 296/35.1 |
| 2008/0036240 A1 * | 2/2008 | Lusk | B60R 16/0207 296/178 |

(Continued)

FOREIGN PATENT DOCUMENTS

KR  100517412 B1  12/2005

*Primary Examiner* — Pinel E Romain
(74) *Attorney, Agent, or Firm* — Slater Matsil, LLP

(57) ABSTRACT

A sandwich panel floor modular structure includes a sandwich panel configured to be fixed on a floor panel of a vehicle, a center rail embedded in the sandwich panel and configured to guide a console to move in a longitudinal direction of the vehicle, and seat rails embedded in the sandwich panel and spaced apart from both sides of the center rail, the seat rails configured to guide a seat to move in the longitudinal direction of the vehicle.

20 Claims, 3 Drawing Sheets

(56) References Cited

U.S. PATENT DOCUMENTS

| | | | |
|---|---|---|---|
| 2008/0290680 A1* | 11/2008 | Busha | B60N 3/101 296/24.34 |
| 2008/0303302 A1* | 12/2008 | Sturt | B60R 7/04 296/24.34 |
| 2020/0369212 A1* | 11/2020 | Zeuner | B60R 5/00 |

* cited by examiner

[FIG. 1]
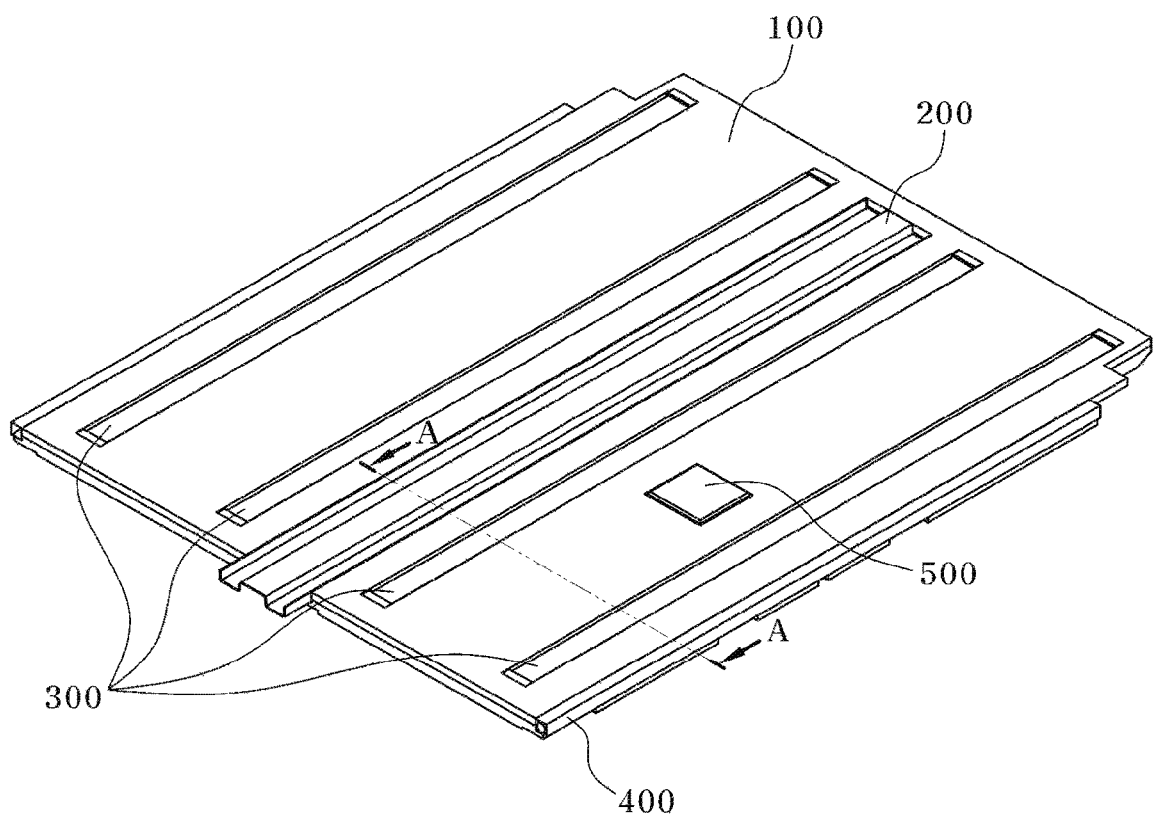
[FIG. 2]
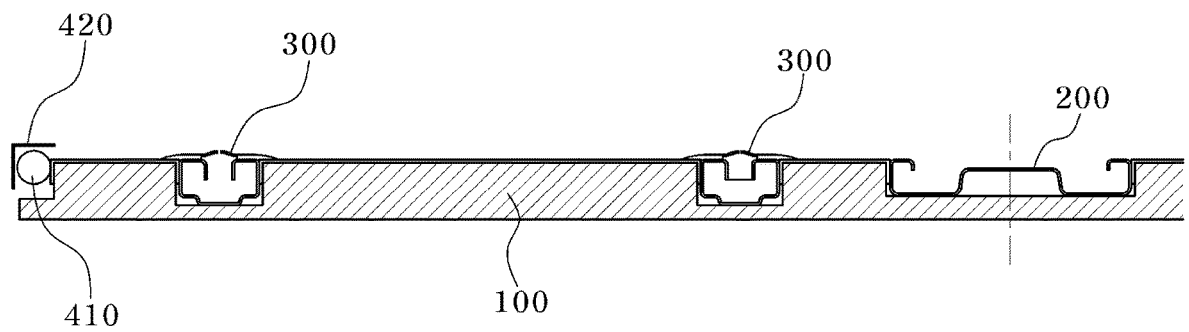

[FIG. 3]
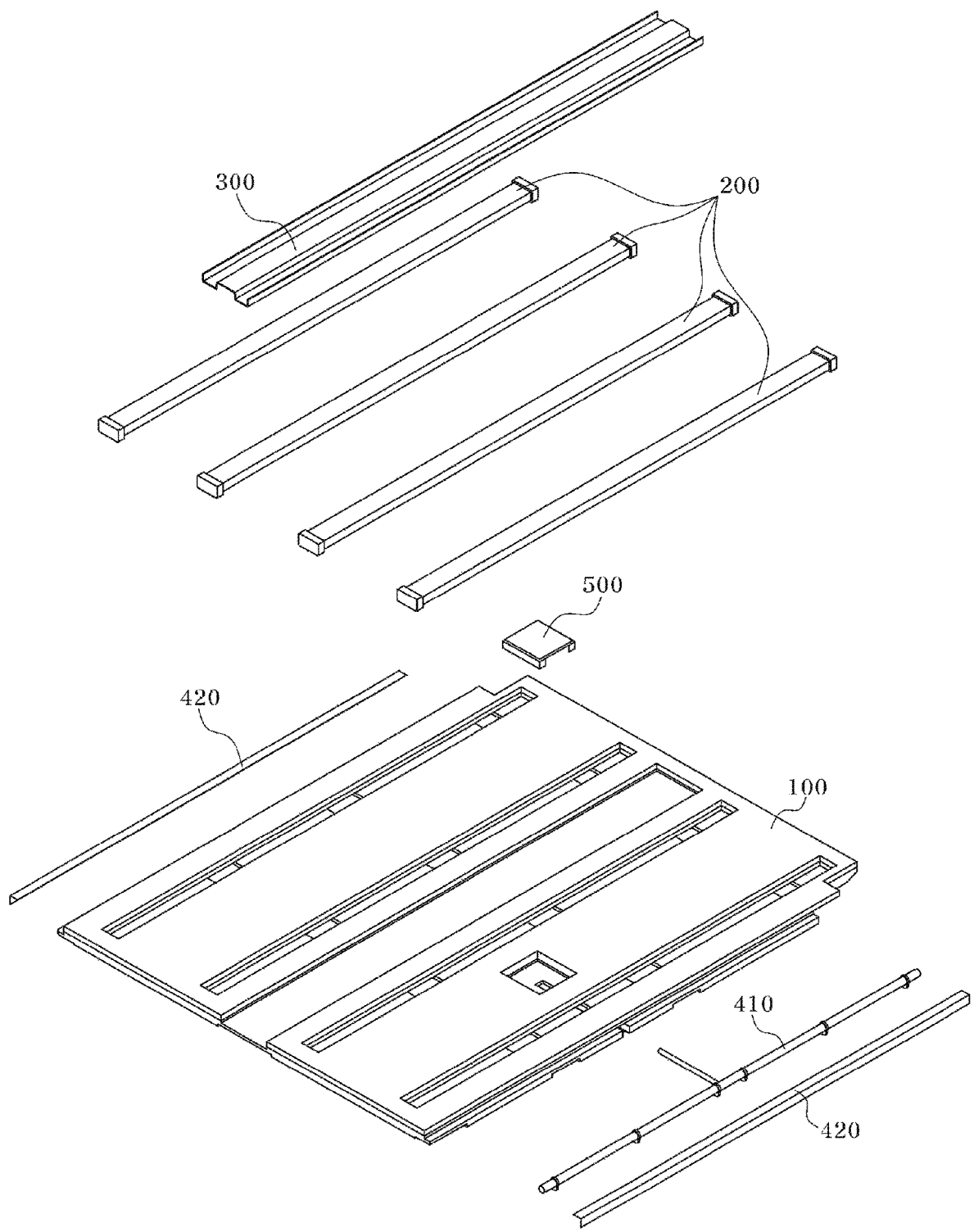

[FIG. 4]
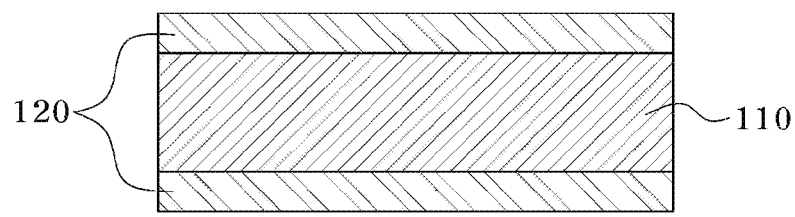
[FIG. 5]
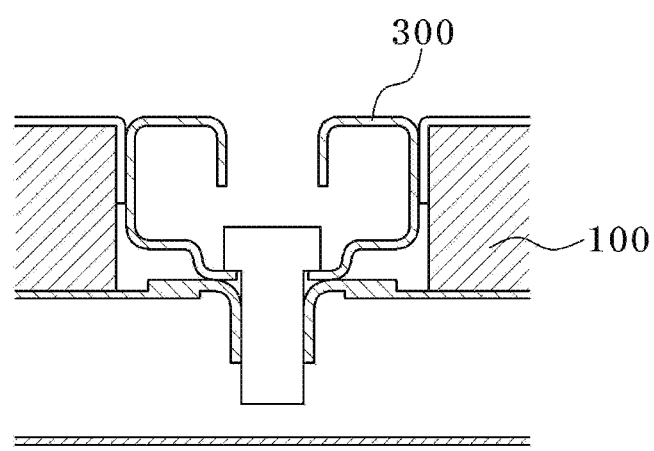

SANDWICH PANEL FLOOR MODULAR STRUCTURE

CROSS-REFERENCE TO RELATED APPLICATIONS

This application claims the benefit of Korean Patent Application No. 10-2019-0164233, filed on Dec. 11, 2019, which application is hereby incorporated herein by reference.

TECHNICAL FIELD

The present disclosure relates to a sandwich panel floor modular structure.

BACKGROUND

In general, a vehicle seat slide device refers to a device provided beneath each of a driver's seat and a passenger seat in a vehicle to move the seat forward and backward according to an occupant's body type.

A typically known vehicle seat slide device is provided between a lower portion of a seat cushion frame beneath a seat cushion and a vehicle floor.

That is, the conventional seat slide device includes tracks provided forward and backward on the vehicle floor, rails provided on both sides of the lower portion of the seat cushion frame to slide on the tracks, and a slide means for moving a seat forward and backward through an external power source.

However, the conventional vehicle seat slide device configured as described above is problematic in that it lowers the utilization of the inner space of the seat and requires a large amount of material.

In addition, in the case where a floor assembly is formed of a plurality of steel parts, a separate jig and a facility structure are required for coupling between the parts. Moreover, there is a problem that processing facilities must be provided in several steps in order to weld the parts.

The above information disclosed in this Background section is only for enhancement of understanding of the background of the disclosure and therefore it may contain information that does not form the prior art that is already known to a person of ordinary skill in the art.

Korean Patent No. 10-0517412 forms a part of the related art.

SUMMARY

Embodiments of the present disclosure can solve problems associated with prior art.

The present disclosure relates to a sandwich panel floor modular structure. Particular embodiments relate to a sandwich panel floor modular structure capable of increasing an interior space of a vehicle through the modular structure, which is temporarily assembled to a sandwich panel configured to embed various components therein, and to improving indoor habitability because there is no protruding portion on the bottom of the vehicle.

In one aspect, embodiments of the present disclosure provide a sandwich panel floor modular structure in which various components are temporarily assembled to a sandwich panel configured to embed the components therein.

In another aspect, embodiments of the present disclosure provide a sandwich panel floor modular structure that includes a sandwich panel composed of a honeycomb structural core made of polypropylene resin and a skin made of glass fiber and polypropylene resin.

The present disclosure is not limited to the above-mentioned aspects and other aspects and advantages of the present disclosure can be understood by the following description and become apparent with reference to the embodiments of the present disclosure. Also, it is obvious to those skilled in the art to which the present disclosure pertains that the aspects and advantages of the present disclosure can be realized by the means as claimed and combinations thereof.

The above and other aspects can be accomplished by the provision of a sandwich panel floor modular structure.

In a preferred embodiment, there is provided a sandwich panel floor modular structure that includes a sandwich panel fixed on a floor panel of a vehicle and configured to embed components therein, a center rail embedded in the sandwich panel to guide a console to move in a longitudinal direction of the vehicle, and seat rails embedded in the sandwich panel while being spaced apart from both sides of the center rail and guiding a seat to move in the longitudinal direction of the vehicle.

The sandwich panel floor modular structure may further include a wiring section formed at an outer end of the sandwich panel, and an amplifier fixed to one surface of the sandwich panel.

The wiring section may include a wiring embedded along the outer end of the sandwich panel, and a wiring cover formed along the wiring to surround the wiring.

The sandwich panel may include a core having a honeycomb structure, and skins bonded to inner and outer surfaces of the core in a sandwich form.

The core may be thicker than the skins.

The core may be made of one selected from the group consisting of polypropylene, polyethylene terephthalate, polycarbonate, aluminum, and nomex, and one selected from the group consisting of polyurethane, polyvinyl chloride, and silicon.

Each of the skins may be made of one selected from the group consisting of carbon fiber, glass fiber, nomex fiber, kevlar fiber, nylon fiber, polyethylene terephthalate fiber, and steel plate, and synthetic resin.

Each of the skins may be made of a continuous fiber-reinforced thermoplastic composite material (CFT).

The seat rails may be bolted to the floor panel of the vehicle.

The center rail, the seat rails, the wiring section, and the amplifier may be inserted into the sandwich panel by one of computer numerical control (CNC), ultrasonic cutting, laser cutting, water jet, and hot wire cutting.

The sandwich panel floor modular structure may further include an adhesive between the sandwich panel and the center rail, the seat rails, the wiring section, and the amplifier.

Other aspects and preferred embodiments of the disclosure are discussed infra.

It is understood that the term "vehicle" or "vehicular" or other similar term as used herein is inclusive of motor vehicles in general such as passenger automobiles including sports utility vehicles (SUVs), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein:

FIG. 1 is a perspective view illustrating a sandwich panel floor modular structure according to an embodiment of the present disclosure;

FIG. 2 is a cross-sectional view taken along line A-A of FIG. 1 illustrating the sandwich panel floor modular structure according to an embodiment of the present disclosure;

FIG. 3 is a view illustrating a configuration of a sandwich panel floor modular structure according to an embodiment of the present disclosure;

FIG. 4 is a cross-sectional view illustrating a sandwich panel of the sandwich panel floor modular structure according to an embodiment of the present disclosure; and FIG. 5 is a cross-sectional view illustrating a sandwich panel floor modular structure according to an embodiment of the present disclosure bolted to a vehicle body floor panel.

It should be understood that the appended drawings are not necessarily to scale, presenting a somewhat simplified representation of various preferred features illustrative of the basic principles of the disclosure. The specific design features of embodiments of the present disclosure as disclosed herein, including, for example, specific dimensions, orientations, locations, and shapes will be determined in part by the particular intended application and use environment.

In the figures, reference numbers refer to the same or equivalent parts of embodiments of the present disclosure throughout the several figures of the drawing.

DETAILED DESCRIPTION OF ILLUSTRATIVE EMBODIMENTS

Hereinafter reference will now be made in detail to various embodiments of the present disclosure, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

In addition, the term "part" or the like described herein refer to a unit for processing at least one function or operation, which may be implemented by hardware or software, or in combination thereof.

FIG. 1 is a perspective view illustrating a sandwich panel floor modular structure according to an embodiment of the present disclosure. FIG. 2 is a cross-sectional view taken along line A-A of FIG. 1 illustrating the sandwich panel floor modular structure according to an embodiment of the present disclosure.

Referring to FIGS. 1 and 2, the sandwich panel floor modular structure according to an embodiment of the present disclosure includes a sandwich panel 100 fixed on a floor panel of a vehicle and configured to embed components therein, a center rail 200 embedded in the sandwich panel 100 to guide a console to move in a longitudinal direction of the vehicle, and seat rails 300 embedded in the sandwich panel 100 while being spaced apart from both sides of the center rail 200 and guiding a seat to move in the longitudinal direction of the vehicle.

In addition, the sandwich panel floor modular structure may further include a wiring section 400 formed at the outer end of the sandwich panel 100 and an amplifier 500 fixed to one surface of the sandwich panel 100.

The sandwich panel 100 may be fixed on the floor panel of the vehicle. More preferably, the sandwich panel 100 may be formed on the upper surface of the floor panel of the vehicle to embed the components therein. The sandwich panel 100 may have a plurality of grooves formed correspondingly to the components and the grooves may extend in the longitudinal direction of the vehicle.

The seat and console of the vehicle may be placed on the upper surface of the sandwich panel 100. More preferably, the seat and the console may move along the upper surface of the sandwich panel 100 in the longitudinal direction of the vehicle.

The center rail 200 may be embedded in the sandwich panel 100 and guide the console to move in the longitudinal direction of the vehicle. More preferably, the center rail 200 may be positioned at the center of the sandwich panel 100 in the width direction of the vehicle so that the sandwich panel 100 is symmetric around the center rail 200. The center rail 200 may be connected to the console of the vehicle so that the console moves in the longitudinal direction.

The seat rails 300 may be spaced apart from both sides of the center rail 200 and embedded in the sandwich panel 100. More preferably, two seat rails 300 may be spaced apart from the respective sides of the center rail 200 at a predetermined interval.

The seat rails 300 may be connected to the seat so as to guide the seat to move in the longitudinal direction of the vehicle. Each of the seat rails 300 may have a width smaller than the center rail 200.

The wiring section 400 may be formed at the outer end of the sandwich panel 100. More preferably, two wiring sections 400 may be symmetrically formed at both outer ends of the sandwich panel 100 in the width direction thereof. Each of the wiring sections 400 may include a wiring 410 embedded along the outer end of the sandwich panel 100 and a wiring cover 420 formed along the wiring 410 to surround the wiring 410.

The wiring 410 may serve to supply electrical signals and power to each system in the vehicle. The wiring 410 may be inserted into the sandwich panel 100 and protected by the wiring cover 420, thereby preventing interference with other correlated components.

The wiring 410 may be easily detached from the sandwich panel 100 to facilitate maintenance. More preferably, the wiring 410 and the wiring cover 420 may be fixed to the sandwich panel 100 using fastening components that are easily removable.

The amplifier 500 may be fixed to one surface of the sandwich panel 100. More preferably, the sandwich panel 100 may have a groove formed correspondingly to the amplifier 500 so that the amplifier 500 is inserted into the space between the seat rails 300. The amplifier 500 may serve to amplify audio signals input from vehicle devices.

The amplifier 500 may include a signal input terminal, a speaker output terminal, a power supply gain, a crossover, and the like.

FIG. 3 is a view illustrating a configuration of a sandwich panel floor modular structure according to an embodiment of the present disclosure.

Referring to FIG. 3, the sandwich panel floor modular structure according to an embodiment of the present disclosure may be configured such that the center rail 200, the seat rails 300, the wiring sections 400, and the amplifier 500 are inserted into the sandwich panel 100 by one of CNC, ultrasonic cutting, laser cutting, water jet, and hot wire cutting.

In addition, the sandwich panel floor modular structure may further include an adhesive between the sandwich panel 100 and the center rail 200, the seat rails 300, the wiring sections 400, and the amplifier 500.

The sandwich panel 100 may have grooves formed correspondingly to the center rail 200, the seat rails 300, the wiring sections 400, and the amplifier 500, respectively, for insertion of them in the sandwich panel 100. The grooves of the sandwich panel 100 for insertion of components may be formed by digging or cutting using one of CNC, ultrasonic cutting, laser cutting, water jet, and hot wire cutting.

More preferably, the grooves may be formed in the sandwich panel 100 by CNC machining so as to adjust the positions and depths of the grooves in which the components are embedded. In addition, using the CNC machining is advantageous in terms of simple equipment and low maintenance cost.

After the grooves for insertion of components are machined in the sandwich panel 100, the center rail 200, the seat rails 300, the wiring sections 400, and the amplifier 500 may be inserted into the machined grooves. After the adhesive is applied to the machined grooves of the sandwich panel 100, the center rail 200, the seat rails 300, the wiring sections 400, and the amplifier 500 may be inserted into the grooves.

Since the sandwich panel floor modular structure further includes the adhesive between the sandwich panel 100 and the center rail 200, the seat rails 300, the wiring sections 400, and the amplifier 500, it is possible to prevent the separation of the individual components of the sandwich panel floor modular structure until the sandwich panel floor modular structure is assembled to the floor panel of vehicle.

The adhesive may be a structural adhesive with excellent shear strength and peel strength. Examples of the adhesive may include a combined type adhesive made of thermosetting resin and elastomer. For example, an epoxy resin adhesive, a urethane structural adhesive, a second generation acrylic adhesive (SGA), and the like may be used, and the present disclosure is not particularly limited thereto. In addition, in order to improve additional sound absorption performance, vibration damping, or the like, a foam made of polyurethane or silicone or a nonwoven fabric made of polyethylene terephthalate may be used by applying the adhesive thereto.

FIG. 4 is a cross-sectional view illustrating a sandwich panel of a sandwich panel floor modular structure according to an embodiment of the present disclosure.

Referring to FIG. 4, the sandwich panel 100 of the sandwich panel floor modular structure according to an embodiment of the present disclosure may include a core 110 having a honeycomb structure and skins 120 bonded to the inner and outer surfaces of the core 110 in a sandwich form.

The core 110 may form a main body of the sandwich panel 100. The core 110 may adjust the thickness and compressive strength of the sandwich panel 100. The core 110 may have a honeycomb structure or a foam shape to absorb energy in case of vehicle collision and to relatively disperse the force applied to an occupant and a vehicle body.

The skins 120 may be bonded to the inner and outer surfaces of the core 110 in a sandwich form. More preferably, the skin 120 bonded to the inner surface of the core 110 may be in contact with the floor panel of the vehicle body, and the skin 120 bonded to the outer surface of the core 110 is exposed to the interior of the vehicle. The skin 120 bonded to the outer surface of the core 110 may be machined together with the core 110 to embed the components in the sandwich panel 100.

Each of the skins 120 may be attached to the core 110 using an adhesive layer. The adhesive layer between the core 110 and the skin 120 is not particularly limited as long as it can secure the adhesion between the skin 120 and the core 110. For example, the adhesive layer may include one selected from the group consisting of an acrylic adhesive, a silicone adhesive, an epoxy adhesive, a rubber adhesive, and a combination thereof.

In this case, the adhesive layer may be a photocuring adhesive or a thermosetting adhesive, and it may be curable by one of photocuring and thermosetting methods, or both.

The sandwich panel 100 of the sandwich panel floor modular structure according to an embodiment of the present disclosure may be configured such that the thickness of the core 110 is greater than the thickness of the skin 120. The sandwich panel 100 may have a thickness equal to or greater than the center rail 200, the seat rails 300, the wiring sections 400, and the amplifier 500 for the flat bottom of the vehicle.

In one example, the thickness of the sandwich panel 100 may be from about 3 mm to about 100 mm. The core 110 may have a thickness of 3 mm to 100 mm, and the skin 120 may have a thickness of 0.5 mm to 10 mm. Through such a configuration, it is possible to secure excellent support strength and to properly maintain the structural rigidity of each of the skins 120 laminated on both sides of the core 110. As the thickness of the core 110 is increased, the strength of the sandwich panel can be enhanced, and as the thickness of the skin 120 is increased, the bending strength of the sandwich panel can be enhanced.

The sandwich panel floor modular structure according to an embodiment of the present disclosure may be configured such that the core 110 is made of one selected from the group consisting of polypropylene, polyethylene terephthalate, polycarbonate, aluminum, and nomex, and one selected from the group consisting of polyurethane, polyvinyl chloride, and silicon.

In addition, the skin 120 may be made of one selected from the group consisting of carbon fiber, glass fiber, nomex fiber, kevlar fiber, nylon fiber, polyethylene terephthalate fiber, and steel plate, and synthetic resin.

For the skin 120, a continuous fiber-reinforced thermoplastic composite material (CFT) may be used and its thickness may be adjusted to increase or decrease as needed. By the sandwich structure in which the CFT, the continuous fiber-reinforced thermoplastic composite material, is integrally formed on both sides of the core 110, the overall sandwich panel is made of a lightweight material with high strength and stiffness and excellent stability. Therefore, the sandwich panel floor modular structure can be high in strength and light in weight without deformation.

FIG. 5 is a cross-sectional view illustrating a sandwich panel floor modular structure according to an embodiment of the present disclosure bolted to the vehicle body floor panel.

Referring to FIG. 5, the seat rails 300 of a sandwich panel floor modular structure according to an embodiment of the present disclosure may be bolted to the floor panel of the vehicle.

Conventionally, the steel floor may be fixed to the vehicle body by welding which is a relatively expensive and dangerous process. However, the sandwich panel 100 may be fixed to the vehicle body by means of bolts in embodiments of the present disclosure.

Each of the bolt heads and nuts may have a thickness that enables it to be inserted into the sandwich panel 100 to form the flat bottom of the vehicle. A bolt coupling structure may be formed on each of the seat rails 300 positioned at both sides of the center rail 200. More preferably, four bolt coupling structures may be formed and spaced apart from each other on one seat rail 300.

In summary, the sandwich panel floor modular structure of embodiments of the present disclosure can increase the interior space of the vehicle through the modular structure in which various components are temporarily assembled to the sandwich panel 100 configured to embed the components therein and improve indoor habitability because there is no protruding portion on the bottom of the vehicle.

As is apparent from the above description, the present disclosure can obtain the following effects by the configuration, combination, and relationship of the components described in the exemplary embodiments.

It is possible to increase the interior space of the vehicle through the modular structure in which various components are temporarily assembled to the sandwich panel configured to embed the components therein and to improve indoor habitability because there is no protruding portion on the bottom of the vehicle.

The sandwich panel floor modular structure can reduce the weight of the vehicle to improve fuel efficiency while absorbing energy in case of vehicle collision to disperse the impact on the occupants and the vehicle body in the event of an accident, through the sandwich panel composed of the honeycomb structural core made of polypropylene resin and the skin made of glass fiber and polypropylene resin.

The above detailed description is illustrative of the disclosure. In addition, the above description is intended to illustrate and explain the preferred embodiments of the present disclosure, and the present disclosure may be used in various other combinations, modifications, and environments. That is, it is possible to make changes or modifications within the scope of the concept of the disclosure disclosed herein, within the scope of the disclosure, and/or within the skill and knowledge of the art. The described embodiments are intended to illustrate the best mode for carrying out the technical idea of the present disclosure and various changes may be made in the specific applications and uses of the present disclosure. Accordingly, the detailed description of the disclosure is not intended to limit the disclosure to the disclosed embodiments. It is also to be understood that the appended claims are intended to cover such other embodiments.

What is claimed is:

1. A sandwich panel floor modular structure comprising:
   a sandwich panel configured to be fixed on a floor panel of a vehicle;
   a center rail embedded in the sandwich panel and configured to guide a console to move in a longitudinal direction of the vehicle; and
   seat rails embedded in the sandwich panel and spaced apart from opposite sides of the center rail, the seat rails configured to guide a seat to move in the longitudinal direction of the vehicle.

2. The sandwich panel floor modular structure of claim 1, further comprising:
   a wiring section formed at an outer end of the sandwich panel; and
   an amplifier fixed to one surface of the sandwich panel.

3. The sandwich panel floor modular structure of claim 2, wherein the wiring section comprises:
   a wiring embedded along the outer end of the sandwich panel; and
   a wiring cover formed along the wiring to surround the wiring.

4. The sandwich panel floor modular structure of claim 2, wherein the center rail, the seat rails, the wiring section, and the amplifier are inserted into the sandwich panel by one of CNC, ultrasonic cutting, laser cutting, water jet, or hot wire cutting.

5. The sandwich panel floor modular structure of claim 2, further comprising an adhesive between the sandwich panel and each of the center rail, the seat rails, the wiring section, and the amplifier.

6. The sandwich panel floor modular structure of claim 1, wherein the sandwich panel comprises:
   a core having a honeycomb structure; and
   skins bonded to inner and outer surfaces of the core in a sandwich form.

7. The sandwich panel floor modular structure of claim 6, wherein the core is thicker than the skins.

8. The sandwich panel floor modular structure of claim 6, wherein the core is made of one selected from the group consisting of polypropylene, polyethylene terephthalate, polycarbonate, aluminum, and nomex, and one selected from the group consisting of polyurethane, polyvinyl chloride, and silicon.

9. The sandwich panel floor modular structure of claim 6, wherein each of the skins is made of one selected from the group consisting of carbon fiber, glass fiber, nomex fiber, kevlar fiber, nylon fiber, polyethylene terephthalate fiber, and steel plate, and synthetic resin.

10. The sandwich panel floor modular structure of claim 6, wherein each of the skins is made of a continuous fiber-reinforced thermoplastic composite material (CFT).

11. The sandwich panel floor modular structure of claim 1, wherein the seat rails are configured to be bolted to the floor panel of the vehicle.

12. A vehicle comprising:
   a vehicle body comprising a floor panel;
   a console;
   a vehicle seat; and
   a sandwich panel floor modular structure comprising:
      a sandwich panel fixed on the floor panel;
      a center rail embedded in the sandwich panel and configured to guide the console to move in a longitudinal direction of the vehicle; and
      seat rails embedded in the sandwich panel and spaced apart from both sides of the center rail, the seat rails bolted to the floor panel of the vehicle and configured to guide the vehicle seat to move in the longitudinal direction of the vehicle.

13. The vehicle of claim 12, wherein the sandwich panel floor modular structure further comprises:
   a wiring section formed at an outer end of the sandwich panel; and
   an amplifier fixed to one surface of the sandwich panel.

14. The vehicle of claim 13, wherein the wiring section comprises:
a wiring embedded along the outer end of the sandwich panel; and
a wiring cover formed along the wiring to surround the wiring.

15. The vehicle of claim 13, wherein the center rail, the seat rails, the wiring section, and the amplifier are inserted into the sandwich panel by one of CNC, ultrasonic cutting, laser cutting, water jet, or hot wire cutting.

16. The vehicle of claim 13, further comprising an adhesive between the sandwich panel and each of the center rail, the seat rails, the wiring section, and the amplifier.

17. The vehicle of claim 12, wherein the sandwich panel comprises:
a core having a honeycomb structure; and
skins bonded to inner and outer surfaces of the core in a sandwich form.

18. The vehicle of claim 17, wherein:
the core is made of one selected from the group consisting of polypropylene, polyethylene terephthalate, polycarbonate, aluminum, and nomex, and one selected from the group consisting of polyurethane, polyvinyl chloride, and silicon; and
each of the skins is made of one selected from the group consisting of carbon fiber, glass fiber, nomex fiber, kevlar fiber, nylon fiber, polyethylene terephthalate fiber, and steel plate, and synthetic resin.

19. The vehicle of claim 17, wherein each of the skins is made of a continuous fiber-reinforced thermoplastic composite material (CFT).

20. A sandwich panel floor modular structure comprising:
a sandwich panel configured to be fixed on a floor panel of a vehicle, the sandwich panel comprising a core having a honeycomb structure, a first skin bonded to an inner surface of the core, and a second skin bonded to an outer surface of the core;
a center rail embedded in the sandwich panel and configured to guide a console to move in a longitudinal direction of the vehicle;
seat rails embedded in the sandwich panel and spaced apart from both sides of the center rail, the seat rails configured to be bolted to the floor panel of the vehicle and configured to guide a seat to move in the longitudinal direction of the vehicle;
a wiring section formed at an outer end of the sandwich panel, the wiring section comprising a wiring embedded along the outer end of the sandwich panel and a wiring cover formed along the wiring to surround the wiring; and
an amplifier fixed to one surface of the sandwich panel.

* * * * *